United States Patent
Kong et al.

(10) Patent No.: US 7,229,519 B2
(45) Date of Patent: Jun. 12, 2007

(54) BURNING EQUIPMENT FOR GREEN SHEET OF PLASMA DISPLAY PANEL AND METHOD OF BURNING THE SAME

(75) Inventors: Sang Jin Kong, Suwon-si (KR); Jin Ho Choi, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/050,825

(22) Filed: Jan. 27, 2005

(65) Prior Publication Data

US 2005/0161147 A1    Jul. 28, 2005

(30) Foreign Application Priority Data

Jan. 27, 2004    (KR)    ................ 10-2004-0005119

(51) Int. Cl.
B32B 37/06    (2006.01)
B32B 37/08    (2006.01)

(52) U.S. Cl. .............. 156/309.9; 156/89.11; 156/282; 156/322; 156/380.9; 156/498; 156/499

(58) Field of Classification Search ............ 156/322, 156/497, 498, 499, 272.2, 273.3
See application file for complete search history.

(56) References Cited

U.S. PATENT DOCUMENTS

| | | | | |
|---|---|---|---|---|
| 3,994,769 A | * | 11/1976 | Gersbeck | 156/499 |
| 4,266,117 A | * | 5/1981 | Pardue et al. | 392/423 |
| 5,316,604 A | * | 5/1994 | Fell | 156/82 |
| 5,587,033 A | * | 12/1996 | Suzuki et al. | 156/164 |
| 5,720,847 A | * | 2/1998 | Nagate et al. | 156/497 |
| 5,806,277 A | * | 9/1998 | Scheifele et al. | 53/374.4 |
| 6,684,925 B2 | * | 2/2004 | Nagate et al. | 156/540 |
| 2005/0148151 A1 | * | 7/2005 | Lee et al. | 438/401 |
| 2006/0003661 A1 | * | 1/2006 | Kim et al. | 445/24 |

FOREIGN PATENT DOCUMENTS

| | | | |
|---|---|---|---|
| JP | 3-176139 | * | 7/1991 |
| JP | 9-320458 | * | 12/1997 |
| JP | 2002-289092 | * | 10/2002 |
| JP | 2002-289093 | * | 10/2002 |
| JP | 2003-136595 | * | 5/2003 |
| JP | 2004-31117 | * | 1/2004 |
| JP | 2004-348999 | * | 12/2004 |
| WO | 2005/068196 | * | 7/2005 |

* cited by examiner

*Primary Examiner*—Melvin Mayes
(74) *Attorney, Agent, or Firm*—McKenna Long & Aldridge LLP

(57) ABSTRACT

An apparatus for burning green sheets of a plasma display panel comprises a feeding part that feeds a green sheet to a plasma display panel substrate, a heat and pressure roller that heats and compresses the green sheet and the plasma display panel substrate from above the plasma display panel substrate, and a heating module that applies heat to a contact portion between the green sheet and the plasma display panel substrate. The heat and pressure roller applies heat and pressure to the green sheet to bring the green sheet into intimate contact with the plasma display panel substrate and to remove residual solvent from the green sheet.

6 Claims, 5 Drawing Sheets

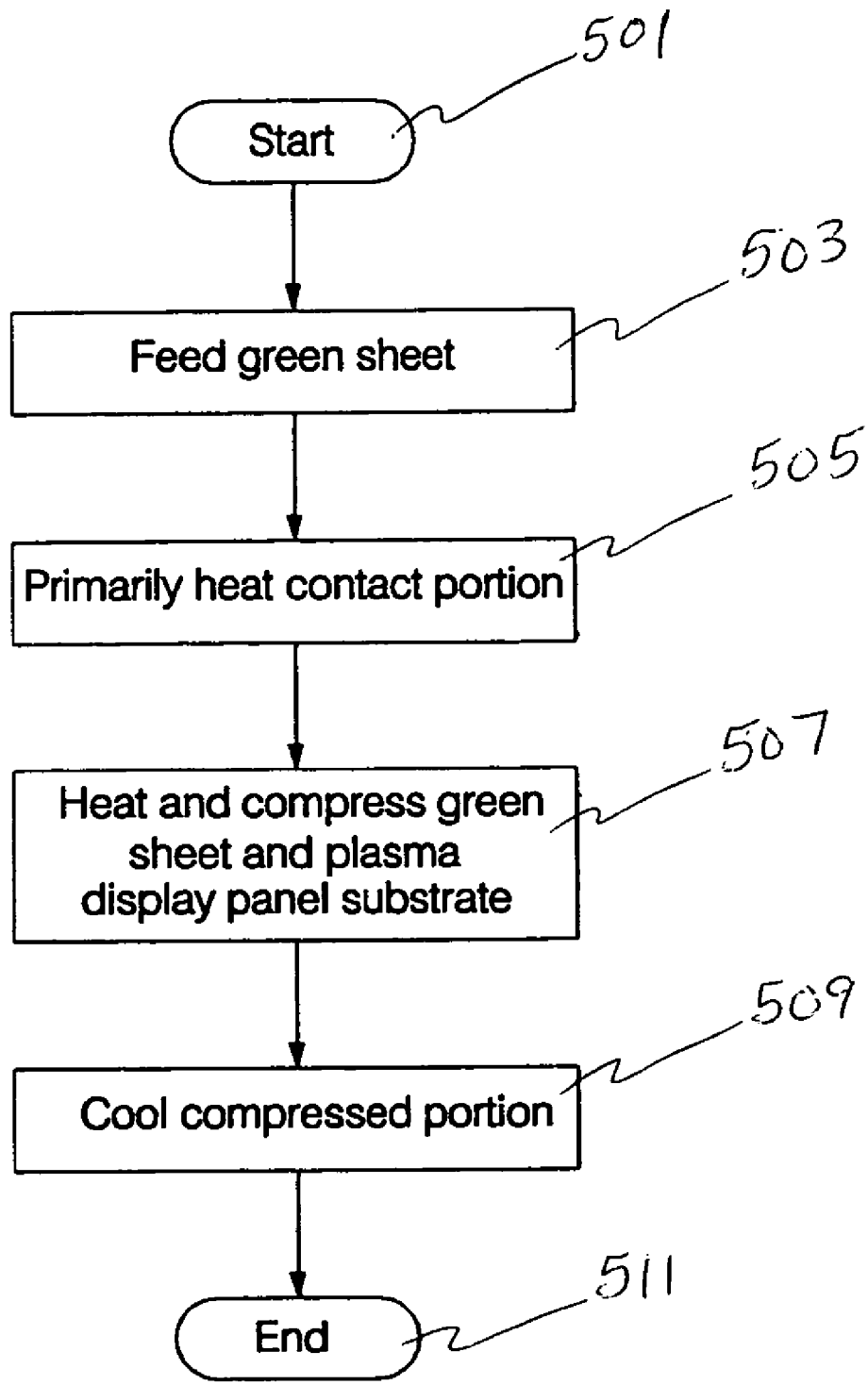

BURNING EQUIPMENT FOR GREEN SHEET OF PLASMA DISPLAY PANEL AND METHOD OF BURNING THE SAME

This application claims the benefit of Korean Patent Application No. 2004-05119 filed in Korea on Jan. 27, 2004, which is hereby incorporated by reference for all purposes as if fully set forth herein.

BACKGROUND OF THE INVENTION

1. Field of the Invention

The invention relates to a plasma display panel, and more particularly to a apparatus and method for burning a green sheet of a plasma display panel.

2. Description of the Related Art

FIG. 1 shows related equipment for burning a green sheet of a plasma display panel (PDP). The related burning equipment comprises: a feeding roller 1 that feeds the green sheet 5 to a PDP substrate 100; a tension roller 2 that imparts an appropriate tension to the green sheet such that the green sheet can be tightly drawn from the feeding roller 1; a heat and pressure roller 3 that heats and compresses the green sheet so as to bring the green sheet into intimate contact with the PDP substrate 100; and a plurality of conveying rollers 4 that convey the PDP substrate 100.

As the heat and pressure roller 3 compresses the green sheet 5 onto the PDP substrate 100, it heats the green sheet 5. Because of the increased temperature of the green sheet 5, solvent, a component of a binder, contained in the green sheet is transformed into a gas and then diffused at the surface of the green sheet.

The above process is repeatedly carried out as the PDP substrate 100 is conveyed by means of conveying rollers 4, so that the solvent present in the green sheet 5 is removed as the green sheet 5 is compressed onto the PDP substrate 100.

Typically, the green sheet 5 is about 10~300 μm thick, which is a relatively high thickness, and contains a great amount of solvent. Because of the thickness and concentration of solvent, it is important to enhance the adhesive force between the "thick" green sheet and the PDP panel substrate, and to effectively remove the solvent from the green sheet such that the solvent does not remain in the green sheet.

Accordingly, the green sheet 5 is rapidly heated for a relatively short time, approximately 5 minutes or less, at a temperature range of approximately 100 to 200° C., within which the solvent can be actively volatized, by the heat and pressure roller 3 such that the solvent present in the green sheet 5 is rapidly removed therefrom, thereby preventing the green sheet film from being damaged due to overheating.

Related burning equipment is adapted to heat and compress the upper side of the green sheet 5 in order to bring the green sheet 5 into intimate contact with the PDP substrate 100 and to remove the solvent from the green sheet 5.

However, the solvent is generally concentrated on the lower surface of the green sheet 5 where the green sheet comes into intimate contact with the PDP substrate 100. Accordingly, the thermal energy generated by the heat and pressure roller 3, which heats the upper surface of the green sheet 5, does not sufficiently transfer to the lower portion of the green sheet 5. As a result, defects, such as bubbles, protrusions, film detachment and the like, are generated because of ineffective solvent removal and reduction in adhesive force between the green sheet and the PDP substrate during the burning process, thus lowering the productivity of the PDP manufacturing process.

In order to solve the problem described above, the prior art approaches have suggested that, after being heated to a temperature of about 100° C., the PDP substrate 100 is introduced into the burning equipment for the green sheet of the plasma display panel. However, using this method, there is a problem of damage to the green sheet caused by overheating.

SUMMARY OF THE INVENTION

Accordingly, the invention is directed to equipment for burning a green sheet of plasma display panel and method of burning the same that substantially obviates one or more of the problems due to limitation and disadvantages of the related art.

An advantage of the invention is to provide burning equipment designed to reduce defects, such as bubbles, protrusions, film detachment and the like, which can occur when burning a rear film of a green sheet for a plasma display panel during a process of manufacturing the plasma display panel, and to prevent the green sheet from being deformed due to heat, thereby increasing productivity and performance of the plasma display panel while reducing manufacturing costs thereof.

Another advantage of the invention is to provide equipment for burning a green sheet of a plasma display panel, designed to heat upper and lower portions of a green sheet attached to a PDP substrate so as to remove solvent present in the green sheet through rapid heat transfer into the green sheet, and to cool the green sheet after burning in order to reduce defects, such as bubbles, protrusions, film detachment and the like, due to residual solvent present in the green sheet while preventing the green sheet from being deformed due to heating, thereby enhancing the productivity of the PDP manufacturing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the invention, as embodied and broadly described, an apparatus for burning a green sheet of a plasma display panel is provided, that comprises: a feeding part that feeds a green sheet to a plasma display panel substrate; a heat and pressure roller that heats and compresses the green sheet and the plasma display panel substrate above the plasma display panel substrate; and a heating module that applies heat to a contact portion between the green sheet and the plasma display panel substrate.

In accordance with another aspect of the invention, there is provided a method of burning a green sheet of a plasma display panel, comprising the steps of: feeding a green sheet to a plasma display panel substrate; primarily heating a contact portion between the green sheet and the plasma display panel substrate by use of a positionable heating module to remove residual solvent present in the lower portion of the green sheet while enhancing the adhesive force between the green sheet and the plasma display panel substrate; heating and compressing the primarily heated green sheet and the plasma display panel substrate to compress the green sheet to the plasma display panel substrate; and conveying the plasma display panel substrate while heating and compressing the green sheet and the plasma display panel substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flow diagram illustrating a method of burning green sheets of a PDP in accordance with the an embodiment of the invention.

DESCRIPTION OF THE ILLUSTRATED EMBODIMENTS

Reference will now be made in detail to an embodiment of the present invention, example of which is illustrated in the accompanying drawings.

Figure 1:
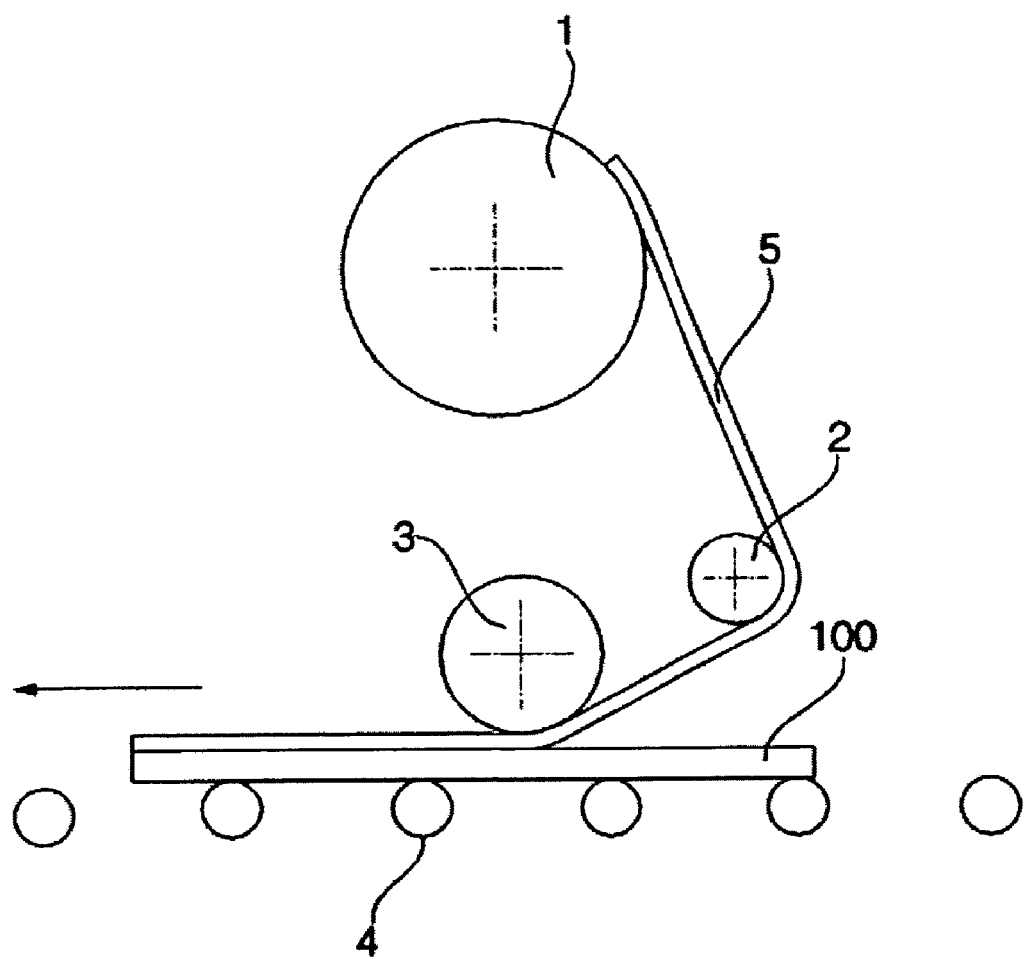
FIG. 1 illustrates a related apparatus for burning a green sheet of a PDP.
Figure 2A:
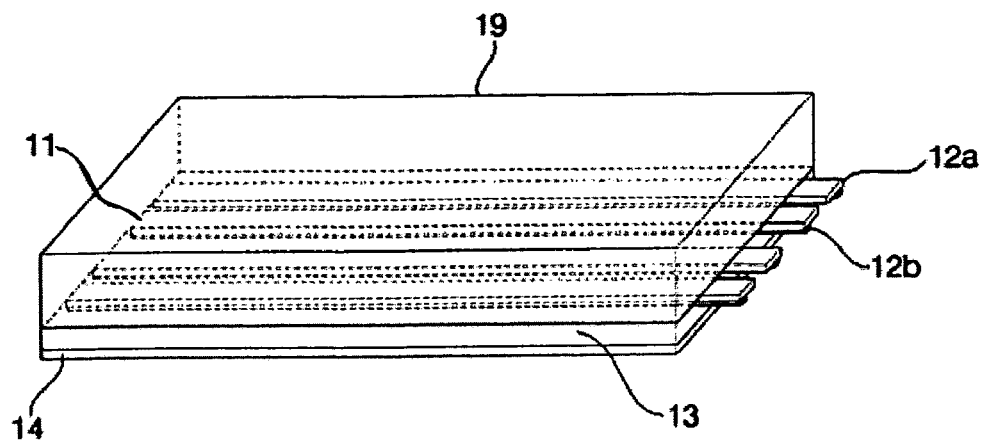
FIGS. 2A and 2B illustrate front and rear panels of a PDP, respectively.
Figure 2B:
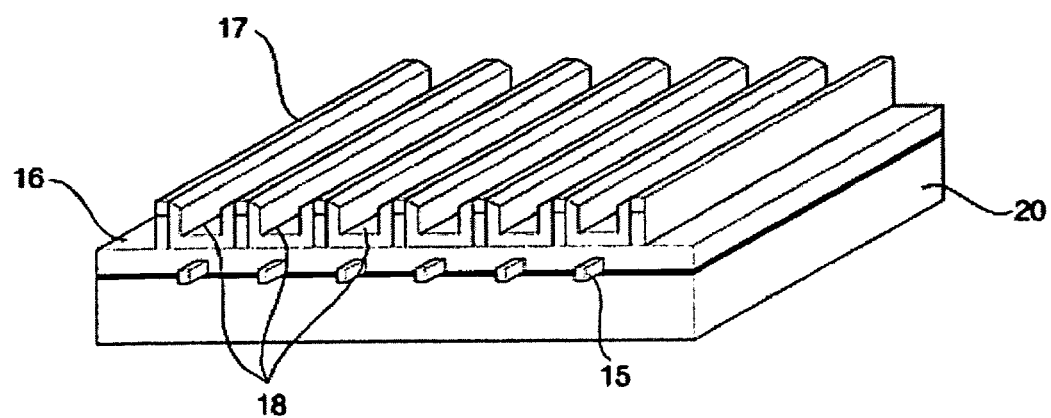

FIGS. 2A and 2B illustrate front and rear panel substrates of a PDP, respectively.

The PDP is a gas discharge display device employing a luminescent phenomenon in which fluorescent materials are excited by vacuum ultraviolet rays generated upon discharge of an inert gas, such as neon (Ne), helium (He), xenon (Xe), and the like, between two sheets of glass substrates opposite to each other.

Referring to FIGS. 2A and 2B, as to the general construction of the PDP, a front panel of the PDP comprises a front panel substrate 19 of the PDP, a plurality of display electrodes 11 having a stripe-shaped arrangement opposite to a rear panel substrate 20, a first dielectric layer 13 stacked on the display electrodes 11 to cover the display electrodes 11 in order to limit discharge current upon discharge while allowing easy generation of wall charge, and a protective layer 14 to protect the first dielectric layer 13, wherein each of the display electrodes 11 includes a bus electrode 12a and a transparent electrode 12b between the front panel substrate 19 and the first dielectric layer. With respect to the construction of the front panel, it is noted that the front panel is inverted such that the front panel substrate 19 faces upward, as seen in FIG. 2A.

A rear panel of the PDP comprises: a rear panel substrate 20; a plurality of address electrodes 15 having a strip-shaped arrangement substantially perpendicular to the display electrodes 11 of the front panel substrate 20 such that an overall display screen is divided into a plurality of cells by the display electrodes 11 and the address electrodes 15; a second dielectric layer 16 applied to the entire surface of the rear panel substrate 20 to protect the address electrodes 15 while electrically insulating individual address electrodes 15 from one another; separation walls 17 having a strip-shaped arrangement on the second dielectric layer 16 to form discharge spaces between separation walls 17; and a fluorescent layer 18 printed and deposited inside the discharge spaces formed by the separation walls 17 to be excited by ultraviolet rays to discharge visible light upon discharge of the respective cells.

When providing the front and rear panels of the PDP, after being applied to the front and rear panel substrates 19 and 20 such that the bus electrodes 12a, the first dielectric layer 13, the address electrodes 15, the second dielectric layer 16, the separation walls 17, the fluorescent layer 18, and the like are correspondingly printed on the front and rear panel substrates 19 and 20, the green sheets are dried, and burnt, by a direct drying method using heating means, such as a heater.

During the process of burning the green sheet, the green sheet is heated, thereby increasing its temperature, so that solvent present in the green sheet is excited into a gaseous state, and discharged to the outside of the green sheet.

Figure 3:
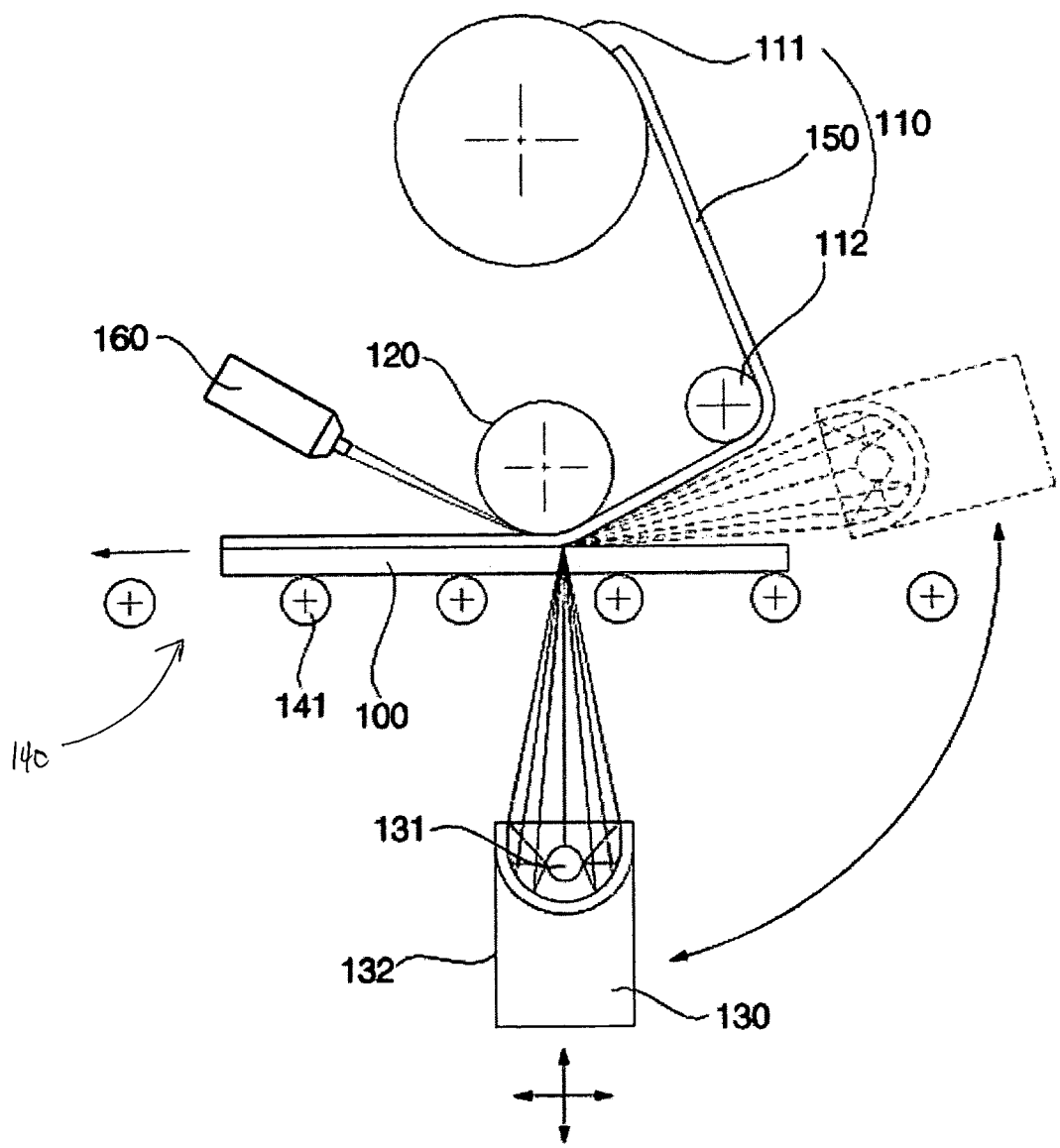
FIG. 3 illustrates an apparatus for burning a green sheet of a PDP in accordance with an embodiment of the invention.
Figure 4:
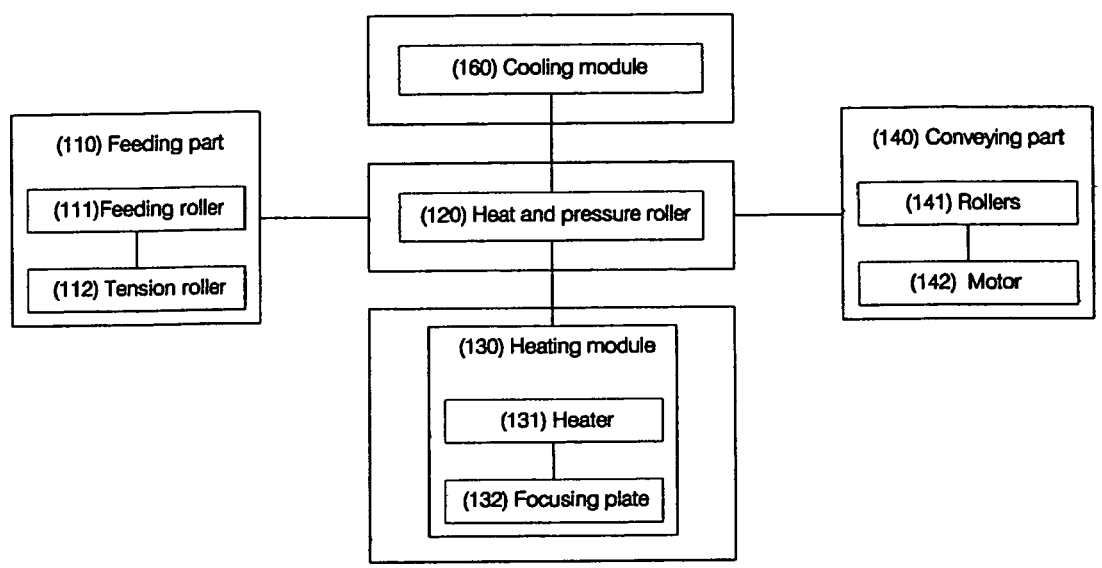
FIG. 4 is a block diagram illustrating the apparatus for burning the green sheet of the PDP in accordance with an embodiment of the invention.

Referring to FIGS. 3 and 4, an apparatus for burning a green sheet of a plasma display panel in accordance with the invention comprises a feeding part 110 that feeds a green sheet 150 to a PDP substrate 100. The feeding part 110 comprises a feeding roller 111 that feeds the green sheet 150, and a tension roller 112 that imparts tension to the green sheet such that the green sheet is tightly drawn from the feeding roller 110.

The green sheet 150 fed from the feeding part 110 comes into intimate contact with the PDP substrate 100 by heating. For heating the green sheet 150, the burning equipment of the invention comprises a heat and pressure roller 120 located on the green sheet 150 to heat and compress the green sheet, and a heating module 130 located below the green sheet 150 to heat a contact portion between a lower portion of the green sheet and the PDP substrate, so that the green sheet 150 comes into intimate contact with the PDP substrate 100.

That is, as the heat and pressure roller 120 applies pressure to the green sheet 150, the green sheet 150 comes into intimate contact with the PDP substrate 100, and as the heating module 130 located below the green sheet 150 heats the contact portion between the green sheet and the PDP substrate, the green sheet closely contacting the PDP substrate is increased in temperature, so that the solvent present in the green sheet 150 is transformed into a gas, which is diffused to the surface of the green sheet 150, and then discharged from the green sheet 150 due to the increased kinetic energy thereof.

The heating module 130 comprises a heater 131 to emit heat, and a focusing plate 132, which focuses thermal rays emitted from the heater to heat the contact portion between the lower portion of the green sheet 150 and the PDP substrate 100. The heater 131 may consist of an infrared heater. The heating module 130 may be configured to be displaced in at least vertical and horizontal directions with respect to the PDP substrate 100.

Since the heating module 130 can be displaced in vertical and horizontal directions and can be accurately adjusted, it can selectively heat the contact portion between the lower portion of the green sheet 150 and the surface of the PDP substrate 100, thereby allowing the solvent present in the green sheet 150 to be discharged therefrom while increasing the adhesive force therebetween. Since the solvent is generally concentrated on the lower portion of the green sheet, the heat can be rapidly transferred to the solvent concentrated on the lower portion of the green sheet 150 through the PDP substrate 100 by means of the heating module 130 located below the PDP substrate 100, so that the solvent present in the green sheet 150 can be effectively discharged therefrom while enhancing the adhesive force between the green sheet 150 and the PDP substrate 100.

Alternatively, as illustrated in FIG. 3, the heating module 130 may be located between a lower space below the green sheet 150, and an upper surface above the PDP substrate 100, such that it directly heats the contact portion between the lower surface of the green sheet and the upper surface of the PDP substrate 100 without heating the region below the PDP substrate 100, thereby enhancing discharge of the solvent present in the green sheet 150 and enhancing the adhesive force between the green sheet 150 and the PDP substrate 100. In this case, since the heat is directly transferred to the contact portion without passing through the PDP substrate 100, the heat transfer can be rapidly performed, thereby providing more effective operation.

Meanwhile, since the heating module 130 is operated in a rapid-heating fashion, rapid heating and rapid cooling can be sequentially performed, so that the green sheet can be prevented from being damaged due to overheating. However, although the rapid-heating method is utilized, in order to further reduce a cooling time after heating and to effectively prevent the green sheet from being damaged due to the heating, the burning equipment of the invention further comprises a cooling module 160, which can more rapidly cool the green sheet 150 heated by the heating module 130 and compressed by the heat and pressure roller 120, thereby preventing deformation of the green sheet caused by overheating. One example of such a cooling method is a method in which the cooling module 160 injects air having a relatively low temperature onto or toward a compressed portion of the green sheet immediately after compressing the green sheet. The cooling module 160 may be configured to be displaced in at least vertical and horizontal directions with respect to the PDP substrate.

Since the cooling module 160 can also be displaced in vertical and horizontal directions and can be accurately adjusted, it can selectively cool the heated green sheet 150, and prevent the deformation of the green sheet 150 through accurate control of the cooling module 160.

The burning equipment for the green sheet of the PDP according to the invention also comprises a conveying part 140, which is located under the PDP substrate 100, and which comprises rollers 141 to convey the PDP substrate 100, and a motor (not shown) to drive the rollers 141. With this construction, as the PDP substrate 100 is conveyed by the conveying part 140 within the burning equipment for the green sheet of the PDP, the green sheet 150 fed from the feeding part 110 is compressed to the PDP substrate 100 when the PDP substrate 100 passes under the heat and pressure roller 120.

A method of burning a green sheet of a PDP in accordance with the present invention will be described hereinafter with reference to FIG. 5.

At step 503, a green sheet 150 is fed by the feeding roller 111 of feeding part 110. At this time, tension is imparted to the green sheet 150 by the tension roller 112 such that the green sheet 150 can be tightly fed to a PDP substrate 100 to prevent creases from forming thereupon.

At the step 505, primary heating is performed to a contact portion between the green sheet 150 and the PDP substrate 100, where the green sheet 150 will be compressed to the PDP substrate 100, by means of a heating module 130. At this time, the contact portion may be selectively heated by accurately controlling the heating module 130 in vertical and horizontal directions. The heating module 130 may heat the contact portion from a location below the PDP substrate 100. Alternatively, the heating module 130 may directly heat the contact portion such that heat is applied to the contact portion by the heating module 130 located between a lower space below the green sheet 150 and an upper surface above the PDP substrate 100. As a result, the solvent present in the green sheet 150 can be effectively discharged therefrom, and the adhesive force between the green sheet 150 and the PDP substrate 100 can be enhanced.

At step 507, the green sheet 150 and the PDP substrate 100 primarily heated at step 305 are heated and compressed by the heat and pressure roller 120.

In the case where the green sheet is heated and compressed by the heat and pressure roller 120, deformation of the green sheet 150 can occur due to the heat. Meanwhile, the heating module 130 is operated in a rapid-heating fashion. Accordingly, the cooling rate after the rapid heating is also high. However, in order to more effectively prevent the heated and compressed green sheet from being deformed, the method of burning the green sheet of the PDP according to the invention may further includes, at step 509, cooling the green sheet using a cooling module 160 immediately after heating and compressing the green sheet. Cooling efficiency can be further enhanced by selectively cooling the heated and compressed portion of the green sheet 150 by way of accurately adjusting the cooling module 160 in the vertical and horizontal directions.

As apparent from the above description, the apparatus and method for burning the green sheet of the plasma display panel according to an embodiment of the invention provides an advantageous effect in that the upper and lower portions of the green sheet attached to the PDP substrate are heated so that the solvent present in the green sheet is effectively removed therefrom while enhancing the adhesive force between the green sheet and the PDP substrate, thereby reducing defects, such as bubbles, protrusions, film detachment and the like, due to the residual solvent present within the green sheet after burning, and in that the heated green sheet is cooled, thereby preventing the green sheet from being deformed due to the heating, thereby enhancing the productivity of the PDP manufacturing process.

It will be apparent to those skilled in the art that various modifications and variation can be made in the invention without departing from the spirit or scope of the invention. Thus, it is intended that the invention cover the modifications and variations of this invention provided they come within the scope of the appended claims and their equivalents.

What is claimed is:

1. A method of burning a green sheet of a plasma display panel, comprising:

feeding a green sheet to a plasma display panel substrate;
  primarily heating a contact portion between the green sheet and the plasma display panel substrate by use of a movable heating module to remove residual solvent present in a lower portion of the green sheet while enhancing the adhesive force between the green sheet and the plasma display panel substrate;
  heating and compressing the green sheet and the plasma display panel substrate to compress the green sheet to the plasma display panel substrate substantially at the primarily heated contact portion; and
  conveying the plasma display panel substrate while heating and compressing the green sheet and the plasma display panel substrate.

2. The method as set forth in claim 1, wherein feeding the green sheet comprises:

feeding the green sheet to the plasma display panel substrate while being tightly drawn to prevent creases from forming thereupon.

3. The method as set forth in claim 1, wherein primarily heating comprises:

selectively heating the contact portion by displacing the heating module in vertical and horizontal directions with respect to the plasma display panel substrate while performing accurate adjustment of the heating module.

4. The method as set forth in claim 1, further comprising:

cooling a heated and compressed portion of the green sheet by use of a cooling module after heating and compressing the primarily heated green sheet to prevent deformation of the green sheet.

5. The method as set forth in claim 4, wherein the cooling module injects air having a relatively low temperature onto the green sheet.

6. The method as set forth in claim 4, wherein said cooling comprises:

selectively cooling the heated and compressed portion of the green sheet by displacing the cooling module in vertical and horizontal directions with respect to the plasma display panel substrate while accurately adjusting the cooling module.

* * * * *